(12) United States Patent
Falconer et al.

(10) Patent No.: US 9,596,664 B2
(45) Date of Patent: Mar. 14, 2017

(54) SYSTEMS AND METHODS FOR DISTRIBUTED COMMUNICATIONS AND PROCESSING

(71) Applicants: Maynard C. Falconer, Portland, OR (US); Omesh Tickoo, Portland, OR (US); Shilpa Talwar, Los Altos, CA (US); Vallabhajosyula S. Somayazulu, Portland, OR (US); Xingang Guo, Portland, OR (US)

(72) Inventors: Maynard C. Falconer, Portland, OR (US); Omesh Tickoo, Portland, OR (US); Shilpa Talwar, Los Altos, CA (US); Vallabhajosyula S. Somayazulu, Portland, OR (US); Xingang Guo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 240 days.

(21) Appl. No.: 14/038,894

(22) Filed: Sep. 27, 2013

(65) Prior Publication Data
US 2015/0092668 A1    Apr. 2, 2015

(51) Int. Cl.
*H04W 4/00* (2009.01)
*H04W 52/46* (2009.01)
*H04W 40/24* (2009.01)

(52) U.S. Cl.
CPC .......... *H04W 52/46* (2013.01); *H04W 40/246* (2013.01)

(58) Field of Classification Search
CPC ..................................................... H04W 28/16
See application file for complete search history.

(56) References Cited

U.S. PATENT DOCUMENTS

| 2009/0196226 | A1* | 8/2009 | Shibao ........................ 370/328 |
| 2010/0110910 | A1* | 5/2010 | Erceg ................. H04L 27/0006 370/252 |
| 2012/0033661 | A1* | 2/2012 | Knappe ............... H04M 1/2535 370/352 |
| 2013/0190025 | A1* | 7/2013 | Sakata .......................... 455/501 |

* cited by examiner

*Primary Examiner* — Shaq Taha
(74) *Attorney, Agent, or Firm* — Sutherland Asbill & Brennan LLP

(57) ABSTRACT

Systems and methods to provide distributed wireless communications from a plurality of wireless network devices are disclosed. The plurality of wireless network devices may be configured to provide direction communications with one or more user devices. This may be performed by adjusting one or more radio parameters associated with the plurality of wireless network devices. The plurality of wireless network devices may cooperate with each other to provide network connectivity for the one or more user devices with relatively high fidelity, relatively high bandwidth, and relatively low power consumption. The plurality of wireless network devices may further provide distributed processing capability to perform tasks for user devices that may provide task requests.

21 Claims, 7 Drawing Sheets

SYSTEMS AND METHODS FOR DISTRIBUTED COMMUNICATIONS AND PROCESSING

TECHNICAL FIELD

This disclosure generally relates to systems and methods for distributed communications and processing.

BACKGROUND

Often times a particular location, such as a home or a place of business may have a variety of wireless communications network devices. These communications network devices may be multifunctional devices that may have suitable wireless components, such as antennas and radios disposed thereon, to enable wireless communications to a larger network, such as a wide area network (WAN) or the Internet. Typically, in these environments, the spatial wireless radio range of the communications network devices may, at least partially, overlap. Therefore, sometimes, in a use environment, one or more wireless communications devices, such as personal mobile devices, may be within radio range of a plurality of wireless communications network devices.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE INVENTION

Figure 1:
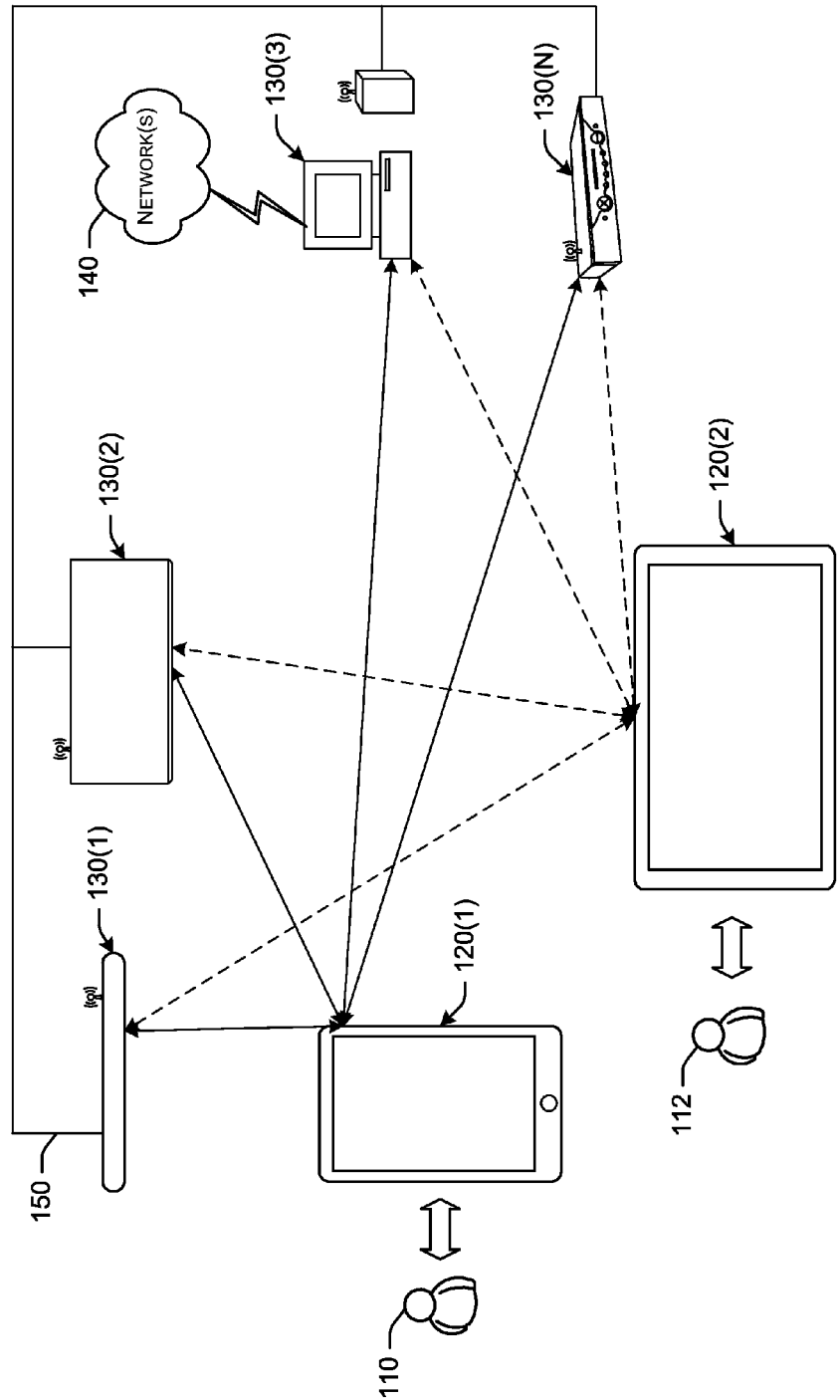
FIG. 1 is a simplified schematic diagram of an example environment having a plurality of wireless network devices configured to communicate with one or more wireless communications devices, in accordance with example embodiments of the disclosure.

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the invention to those skilled in the art. Like numbers refer to like, but not necessarily the same or identical, elements throughout.

Example embodiments of the disclosure may provide systems, apparatus, and methods for utilizing a plurality of wireless network devices, where the plurality of radio ranges of the wireless network devices at least partially overlap. In other words, the spatial range over which the plurality of wireless network devices may be able to communicate with other user devices, such as personal mobile devices, may overlap, at least partially, between at least two of the plurality of wireless network devices. For example, a wireless network device in the form of a Wi-Fi access point (AP) and another wireless network device in the form of a wireless communications enabled television may be in a particular room and may each provide coverage within at least a portion of that particular room. In this example, the wireless coverage and/or range of the two wireless network devices may at least partially overlap. Furthermore, there may be a particular user device, such as a mobile smartphone, in that location, which may be able to communicate with either or both of the wireless network devices.

The systems and methods as described herein may provide for wireless network connectivity provided by the plurality of wireless network devices to one or more user devices within radio range of the plurality of wireless network devices. The wireless network connectivity provided by the plurality of wireless network devices, in certain example embodiments, may operate at a higher fidelity, lower noise, lower power, greater range, and/or greater bandwidth compared to wireless network connectivity provided by a single wireless network devices. In other words, the systems and methods described herein may provide for two or more of the plurality wireless network devices to cooperate in a manner that provides improved wireless network performance, as determined by a variety of network performance metrics, than if the wireless network devices were to operate independent of each other.

According to example embodiments of the disclosure, the plurality of wireless network devices may be communicatively connected to each other by a communicative backbone link. The communicative backbone link may be a hard wired and/or wireless link of any suitable type and may utilize any suitable communications protocols to enable communications between the plurality of wireless network devices. In some example cases, the communicative backbone link may be non-protocol based direct link between two wireless network devices. In other example cases, the communicative link may be protocol-based and may connect two or more wireless network devices. In example embodiments, the communicative backbone link may be a relatively fast (i.e. high bandwidth) link. In some example cases, the communicative backbone link may operate at a greater bandwidth and/or speed than communicative links established between the wireless network devices and user devices within the radio range of the wireless network devices. In other words, the wireless network devices may be configured to communicate among themselves at a higher bandwidth and/or speed than with other user devices to which the wireless network devices may communicate, such as user devices to which the network user devices provide network connectivity. In some further example cases, the communicative backbone link may operate at an order of magnitude or more greater bandwidth and/or speed than the communicative links established between the wireless network devices and user devices within the radio range of the wireless network devices.

Example embodiments of the disclosure may further include one of the plurality of wireless network devices operating as a master wireless network device and the other of the plurality of wireless network devices operating as slave wireless network devices. The master wireless network device may be configured to receive one or more signals from one or more of the slave wireless network devices. These signals may be transmitted by the slave wireless network devices and may represent wireless communications and/or noise received at the one or more slave wireless network devices. These signals may be transmitted by the slave wireless network devices and received by the master wireless network devices via the communicative backbone link. Additionally, the master wireless network device may receive wireless signals directly from one or more user devices that are within radio range of the master wireless network device. In other words, there may be a user device, such as a smartphone or a tablet computing device, within radio range of and transmits signals to a particular master wireless network device, as well as one or more slave wireless network devices. Each of the slave wireless network devices may further provide an indication of the wireless signal received by it from the user device to the master wireless network device. The master wireless network device may further receive wireless signals form the user devices. Additionally, the master wireless network device and the slave wireless network devices may receive noise from one or more sources of noise, such as a microwave oven or a cordless telephone.

The master wireless network device may, based at least in part on the received signals, determine radio parameters associated with each of the slave wireless network devices from which the master wireless network devices receives signals. The master wireless network device may further determine radio parameters for itself based, at least in part, on the received signals form the slave wireless network devices. The radio parameters determined for the slave wireless network devices and the master wireless network device may be used to set radio and/or transceiver signal transmission amplitude, such as by modulating the gain of one or more amplifiers of the radio and/or transceiver, modulating the transmission signal phase, and/or receiver signal sensitivity. In other words, based on the signals received at the slave and master wireless network devices, radio parameters to set characteristics of transmission and/or reception of wireless signals may be set for each of the slave and master wireless network devices. By setting the radio parameters, it may be possible to more optimally tune the transmission and/or reception of the wireless signals between the user devices and the wireless network devices that provide network access to the user devices. As a result, the plurality of wireless network devices may be able to provide higher fidelity communications with the wireless user devices with potentially greater bandwidth, lower energy usage (by the user device(s) and/or the wireless network devices), and/or greater rejection of noise.

The signals that are received by the master wireless network device from the slave wireless network device and from reception of wireless signals from user devices may be used to reconstruct signals received from one or more user devices within radio range of the plurality of wireless network devices. In effect, the plurality of wireless network devices may together serve as a node, such as a Wi-Fi access point (AP), with which each of the user devices communicate. The plurality of the wireless network devices may further provide network connectivity, such as to a wide area network and/or the Internet, to the user devices.

The methods and systems as described herein, according to example embodiments of the disclosure, may be configured to further communicate with more than on user device within the radio/service coverage location of the plurality of wireless network devices. In these cases, the signals received from the user devices may be received by the plurality of wireless network devices at the same or similar times. Therefore, overlapped signals received by the wireless network devices may be deconvolved from each other by the wireless network devices. The deconvolution of the signals received from more than one of the user devices may be determined based at least in part on the wireless signals detected at each of the plurality of the wireless network devices and the radio parameters determined for each of the wireless network devices.

Example embodiments of the disclosure may further include a mechanism of distributed processing of tasks by one or more of the plurality of wireless network devices. User devices that are within the service/coverage area of the plurality of wireless network devices may request processing tasks to be performed by one or more of the wireless network devices. The tasks may be spawned by the user device, transmitted to the plurality of wireless network devices, performed by one or more of the plurality of wireless network devices, and the results of the task may returned to the user device from the one or more of the plurality of wireless network devices.

FIG. 1 is a simplified schematic diagram of an example environment 100 having a plurality of wireless network devices 130(1), 130(2), 130(3), 130(N) (hereinafter referred to collectively or individually as wireless network devices 130) configured to communicate with one or more wireless user devices 120(1), 120(2) (hereinafter referred to collectively or individually as user devices 130), in accordance with example embodiments of the disclosure. The wireless network devices 130 may be any suitable device configured to communicate wirelessly including, but not limited to tablet computing devices, electronic book (ebook) readers, netbook computers, notebook computers, laptop computers, desktop computers, server systems, personal digital assistants (PDA), smart phones, web-enabled televisions, video game consoles, set top boxes (STB), digital video recorder (DVR) systems, combinations thereof, or the like. The user devices 120 may be any suitable communications device including, but not limited to, tablet computing devices, electronic book (ebook) readers, netbook computers, notebook computers, laptop computers, Ultrabook™ computers, personal digital assistants (PDA), smart phones, web-enabled televisions, video game consoles, set top boxes (STB), digital video recorder (DVR) systems, combinations thereof, or the like. The user devices 120 may be used by users 110 for a variety of purposes, including performing processing tasks and/or accessing one or more networks 140, such as the Internet, local area networks (LANs), wide area networks (WANs), or the like.

The networks 140 may include any one or a combination of different types of suitable communications networks, such as cable networks, the Internet, wireless networks, cellular networks, and other private and/or public networks. Furthermore the networks 140 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof.

The user devices 120 may be configured to transmit and/or receive radio frequency wireless signals to/from one or more of the wireless network devices 130, as depicted. Similarly, the wireless network devices 130 may be configured to transmit and/or receive radio frequency wireless signals to/from one or more of the user devices 120. In example embodiments, the wireless network devices 130 may be configured to communicate with more than one user device 120 and provide communications and/or processing services to the more than one user devices 120.

The wireless network devices 130 may further be connected to each other via a communicative backbone link 150. The communicative backbone link 150 may be a hard wired and/or a wireless link of any suitable type and may utilize any suitable communications protocols to enable communications between the wireless network devices 130. In some example cases, the communicative backbone link 150 may be non-protocol based direct link between two wireless network devices. In other example cases, the communicative backbone link 150 may be protocol-based and may connect two or more wireless network devices 130, as depicted. Non-limiting examples of the backbone link 150 may include a twisted pair wire connection, a coaxial cable link, wide area network (WAN), a local area network (LAN), a personal area network (PAN), a wireless personal area network (WPAN), combinations thereof, or the like. In example embodiments, the communicative backbone link 150 may be a relatively fast (i.e. high bandwidth) link. In some example cases, the communicative backbone link may operate at a greater bandwidth and/or speed than communicative links established between the wireless network devices and user devices within the radio range of the wireless network devices. In other words, the wireless network devices 130 may be configured to communicate among themselves at a higher bandwidth and/or speed than with the user devices 120 to which the wireless network devices 130 may communicate, such as user devices 120 to which the network wireless devices 130 provide network 140 connectivity. In some further example cases, the communicative backbone link 150 may operate at an order of magnitude or more greater bandwidth and/or speed than the communicative links established between the wireless network devices 130 and user devices 120 within the radio range of the wireless network devices 130.

Figure 2:
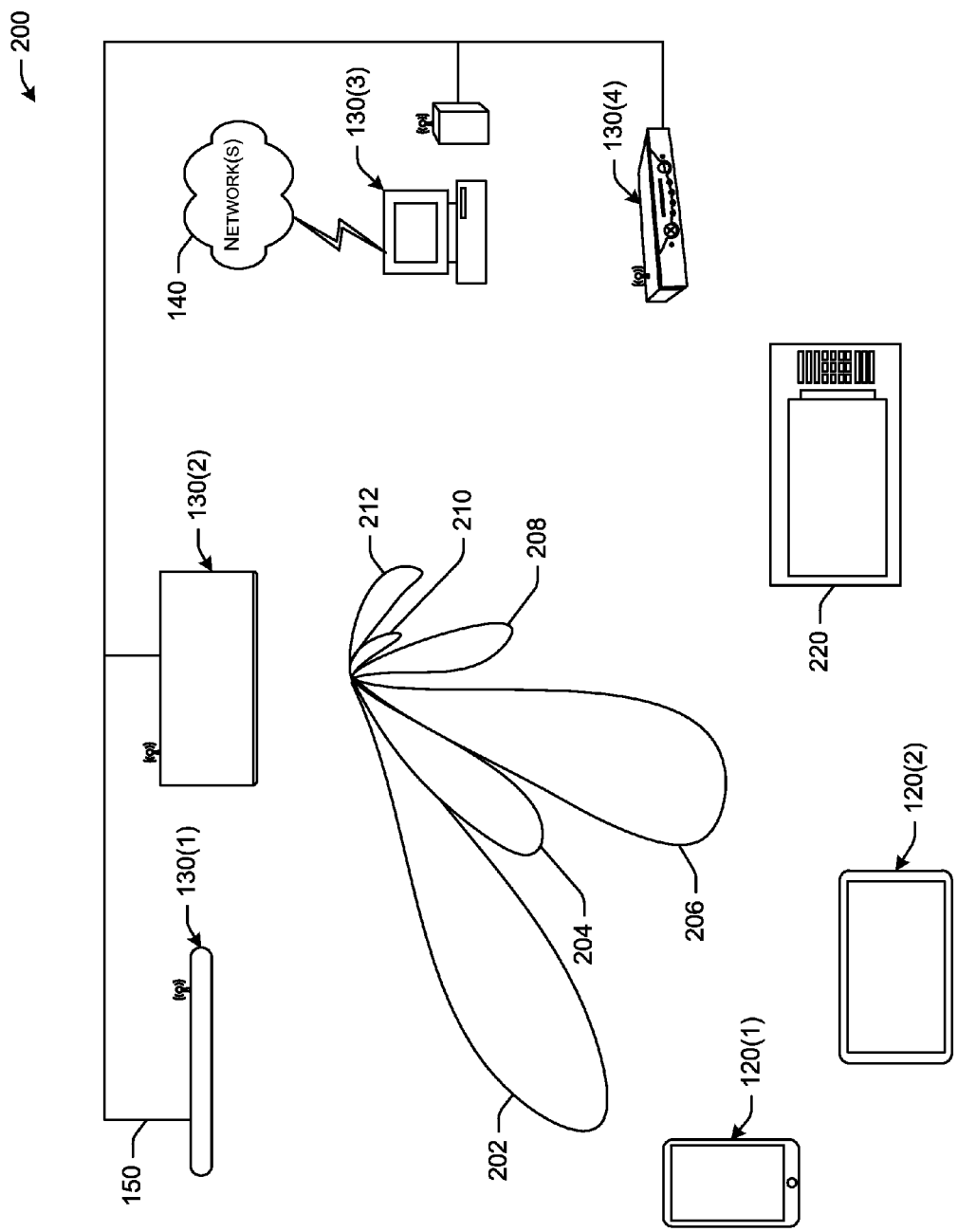
FIG. 2 is a simplified schematic diagram illustrating the example environment of FIG. 1 with the plurality of wireless network devices configured to have directional transmit power and receiver sensitivity, in accordance with example embodiments of the disclosure.

FIG. 2 is a simplified schematic diagram illustrating the example environment 200 of FIG. 1 with the plurality of wireless network devices 130 configured to have directional transmit power and receiver sensitivity, in accordance with example embodiments of the disclosure. Transmit/receive lobes 202, 204, 206, 208, 210, 212 depict the transmitted power and/or receiver sensitivity of the plurality of wireless network devices 130. The wireless network devices 130 operating together may exhibit a relatively higher transmit power and/or receive sensitivity to/from some directions compared to other directions. In effect, the plurality of wireless network devices 130 may be configured to operate as an array of distributed antennas to enable directional communications for improved fidelity, power consumption, error rate, or the like. Radio operations and/or parameters, such as transmitter power, receiver gain, and/or transmitter/receiver phase, may be adjusted to enable directional transmission and/or receipt of communications signals between the user devices 120 and the wireless network devices 130.

As depicted, the transmit power and/or signal amplitude from the plurality of wireless network devices 130 may be relatively greater in the direction of lobes 202, 204, 206, which are roughly in the direction of the user devices 120, than in the direction 208, 210 of an interferences source 220, or the a direction 212 where there are no user devices 120.

The wireless network devices 130 may be configured to cooperate to determine radio parameters of the wireless network devices 130 to be able to provide relatively advantageous transmit/receive directionality. The wireless network devices 130 may receive wireless signals from each of the user devices 120, as well as sources of noise 220. The wireless network devices 130 may further be configured to communicate among themselves, such as via the communicative backbone link 150, to establish radio parameters for each of the wireless network devices 130 for providing relatively advantageous transmit/receive directionality. In other words, according to example embodiments of the disclosure, the plurality of wireless network devices 130 may cooperate to determine and/or set radio and/or transceiver parameters for each of the wireless network devices 130 to establish relatively high fidelity, low noise, and low power communications between the wireless network devices 130 and the user devices 120.

In certain example embodiments, the wireless network devices 130 may share with other wireless network devices 130 signals corresponding to the received wireless signals at each of the wireless network devices 130. These signals that are shared among the wireless network devices 130 may be substantially the wireless signals received at each of the wireless network devices, a demodulated version of the received wireless signal, and/or an in-phase and/or quadrature component of the received wireless signal. These signals may be received by the wireless network devices 130 from the other wireless network devices 130, via the communicative backbone link 150, at a rate and/or bandwidth that may be faster and/or greater than the rate and/or bandwidth with which the user devices 120 communicate with the wireless network devices 130. The wireless network devices 130 may be configured to cooperate to reconstruct the wireless signals transmitted by the user devices 120 to the plurality of wireless network devices 130 based at least in part on the signals shared by the plurality of wireless network devices 130 among themselves. Furthermore, the wireless network devices 130 may be configured to cooperate to dynamically determine radio and/or transceiver parameters associated with each of the wireless network devices 130 to tune the directionality of transmission and reception from the user devices 120, based at least in part on the signals shared by the plurality of wireless network devices 130 among themselves.

In some example embodiments, one of the wireless network devices 130 may operate as a master wireless network device 130 and the other of the wireless network devices may operate as slave wireless network devices 130. In some example cases, the master wireless device 130 may be designated to the wireless network devices 130 with the greatest processing and/or communications bandwidth capability. In these cases, the processing capability of the wireless network device 130 may vary with usage and time. Accordingly, in some cases, the wireless network device 130 that may serve as the master wireless network device may vary with time. For example, as depicted, the wireless network device 130(2), depicted as a television, may have idle processing capability when it is not rendering audio/video (A/V) content and may, therefore, be configured to provide processing bandwidth associated with operating as a master wireless network device while not rendering A/V content. In other example cases, the master wireless device 130 may be designated randomly to one of the wireless network devices 130. In yet, other example cases, the master wireless device 130 may be designated among the wireless network devices 130 according to a variety of other considerations including, but not limited to, relative communications bandwidth of the various wireless network devices 130, spatial location of the wireless network devices 130, specialized software and/or instructions loaded onto the various wireless network devices 130, or the like.

The master wireless network device 130 may be configured to receive signals representative of the wireless communications to/from user devices 120 by the slave wireless network devices 130. The master wireless network device 130 may further be configured to identify the radio parameters associated with itself and the slave wireless network devices 130. Based, at least in part on the combination of the received signals from the slave wireless network devices 130 and the known radio parameters, the master wireless network device 130 may be configured to reconstruct the wireless signals received by the wireless network devices 130 and/or the wireless signals transmitted by the user devices 120. In some example embodiments, the master wireless network device 130 may be configured to separate the signals received from a plurality of user devices 120.

The master wireless network device 130 may further be configured to determine one or more radio parameters for each of the wireless network devices 130 to tune the directionality of the transmission and reception to the plurality of wireless network devices 130. As discussed above, the radio parameters may include or be associated with transmit power, transmit signal amplification, amplifier gain, receiving signal amplification, receiver gain, combinations thereof, or the like. The master wireless network device 130 may repeatedly and/or periodically determine new radio parameters for the wireless network devices 130 and communicate radio parameters corresponding to each of the slave wireless network devices 130 to the respective wireless network devices 130. The master wireless network device 130 may also provide communicative connection or initiate communicative connection via one or more of the slave wireless network devices 130 of the user devices 120 to the one or more networks 140. It will be appreciated that the functions described above as associated with the master wireless network device 130 may, in certain example embodiments, be performed without designating a master wireless network device 130. In these example cases, the functions of reconstructing the transmitted signals of the user devices 120 and/or determining and setting radio parameters based at least in part on the received user device wireless signals may be performed in a distributed manner by more than one wireless network device 130.

In certain example embodiments of the disclosure, the wireless network devices 130 may receive a task request from one or more of the devices 120. These task requests may be different from information and/or data to be communicated to the networks 140 and may be tagged as a task request, so that one or more of the wireless network devices 130 may recognize the transmission as a task request. The task request may include instructions for a processing task to be performed by one or more of the wireless network devices 130 and the results of the task to be returned to the task requesting user device 120. One or more of the wireless network devices 130, such as the master wireless network device 130, may be configured to identify one of these task requests and perform a task associated with the task request and/or provide the task to another processing entity, such as another of the wireless network devices 130, to perform the task associated with the task request. Once the task is performed, results of the task may be transmitted back to the user device by the wireless network devices. In certain example embodiments, multiple task requests may be received by the wireless network devices 130 and the tasks may be distributed to various wireless network devices 130 based at least in part on the level of idle processing bandwidth available at each of the wireless network devices 130. In the same or other example embodiments, tasks from multiple user devices 120 may be queued according to a variety of considerations including, but not limited to, the time when the task request was received, the effect of latency on user experience associated with the task, a priority associated with the requested task, a priority associated with the user device 120 providing the task request, combinations thereof, or the like.

Tasks associated with task requests from user devices 120 may include any variety of tasks including, but not limited to, computational tasks, image rendering tasks, audio rendering tasks, web page rendering tasks, data processing tasks, combinations thereof, or the like. For example, some tasks may include receiving data from a web server and rendering a website. Instead of the user device 120 performing the processing to render the website, the task may be spawned off to one or more of the wireless network devices 130 in the form of a task request. The user device 120, as a result of the task request, may receive back the results of the task, such as, in this case, a rendered website to be displayed on a display of the user device. It will be appreciated that the systems and methods described herein may allow for tasks to be performed using idle processing capability, or on electronic devices, such as the wireless network devices 120, that may have relatively greater processing capability compared to the user devices 120.

Figure 3:
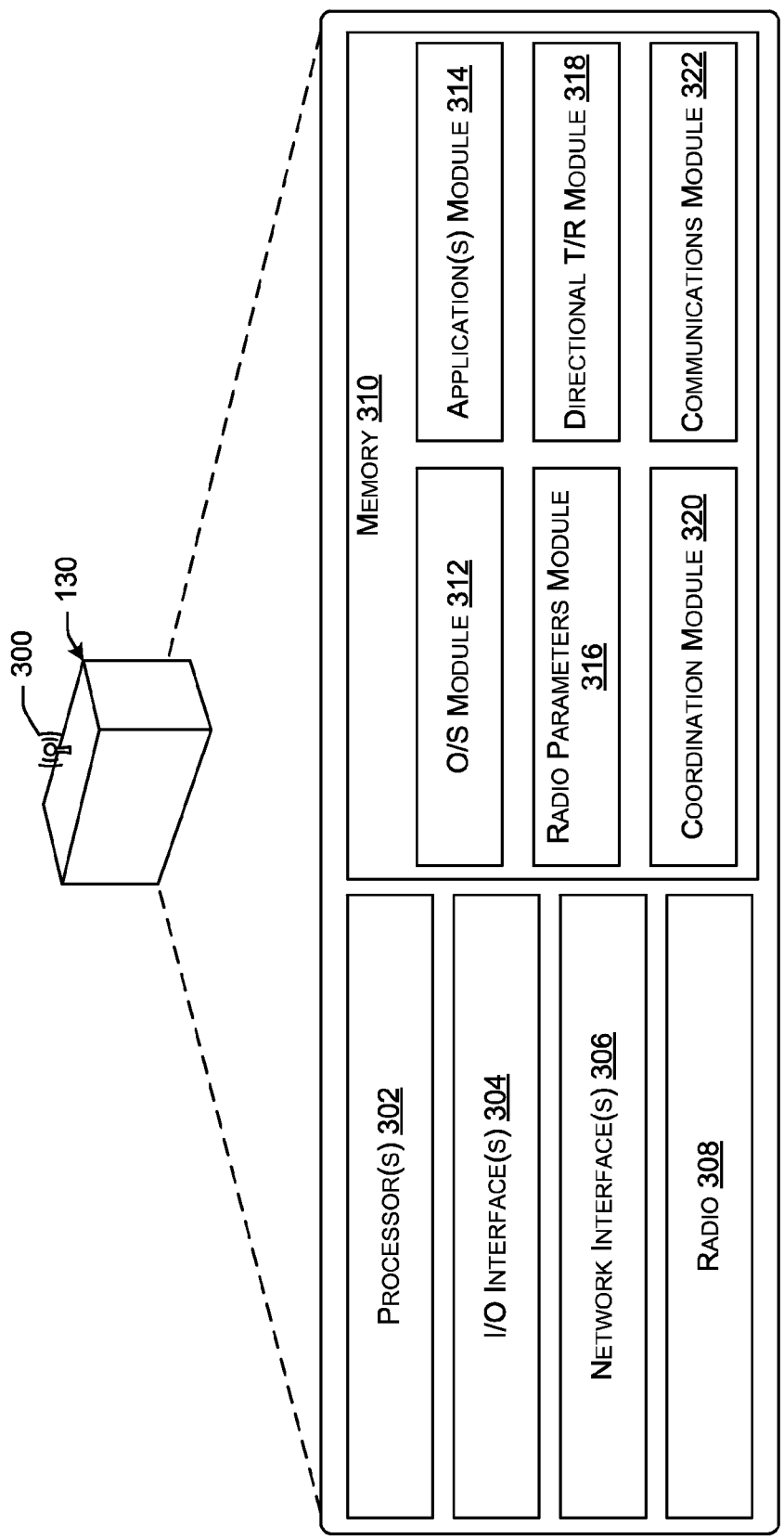
FIG. 3 is a simplified block diagram illustrating an example architecture of a wireless network device, in accordance with example embodiments of the disclosure.

FIG. 3 is a simplified block diagram illustrating an example architecture of a wireless network device 130, in accordance with example embodiments of the disclosure. The wireless network device 130 may include a communications antenna 300 configured for transmitting and/or receiving radio frequency signals from one or more user devices 120. The communications antenna 300 may be any suitable type of antenna corresponding to the communications protocols used by the wireless network device 130. Some non-limiting examples of suitable communications antennas 300 include Wi-Fi antennas, IEEE 802.11 family of standards compatible antennas, directional antennas, non-directional antennas, dipole antennas, folded dipole antennas, patch antennas, multiple-input multiple-output (MIMO) antennas, or the like. The communications antenna 300 may be communicatively coupled to a radio component 308 to transmit and/or receive signals, such as communications signals to and/or from the user devices 120. The wireless network device 130 may include one or more processors 302, one or more input/output (I/O) interfaces 304, one or more network interfaces 306, and one or more memories 310.

The one or more I/O device interfaces 304 may enable the use of one or more (I/O) device(s) or user interface(s), such as a keyboard and/or mouse. A user 110 may be able to administer the systems and methods disclosed herein by interacting with the wireless network devices 130 via the I/O device interfaces 304. The network interfaces(s) 306 may allow the wireless network devices 130 to communicate via the one or more network(s) 150 and/or via other suitable communicative channels. For example, the wireless network devices 130 may be configured to communicate with stored databases, other computing devices or servers, user terminals, or other devices on the networks 150.

The transmit/receive (transceiver) or radio component 308 may include any suitable radio and/or transceiver for transmitting and/or receiving radio frequency (RF) signals in the bandwidth and/or channels corresponding to the communications protocols utilized by the wireless network device 130 to communicate with user devices 120 and/or other wireless network devices 130. The radio component 308 may include hardware and/or software to modulate and/or demodulate communications signals according to pre-established transmission protocols. The radio component 308 may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component 308, in cooperation with the communications antennas 300, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, non-Wi-Fi protocols may be used for communications between user devices 120 and the wireless network devices 130, such as Bluetooth, dedicated short-range communication (DSRC), or other packetized radio communications. The radio component 308 may include any known receiver and baseband suitable for communicating via the communications protocols of the wireless network devices 130. The radio component 308 may further include a low noise amplifier (LNA), additional signal amplifiers, an analog-to-digital (A/D) converter, one or more buffers, and digital baseband.

The processors 302 of the wireless network device 130 may be implemented as appropriate in hardware, software, firmware, or combinations thereof. Software or firmware implementations of the processors 302 may include computer-executable or machine-executable instructions written in any suitable programming language to perform the various functions described. Hardware implementations of the processors 302 may be configured to execute computer-executable or machine-executable instructions to perform the various functions described. The one or more processors 302 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The wireless network device 130 may also include a chip set (not shown) for controlling communications between one or more processors 302 and one or more of the other components of the wireless network device 130. The processors 302 may also include one or more application specific integrated circuits (ASICs) or application specific standard products (ASSPs) for handling specific data processing functions or tasks. In certain example embodiments, the wireless network device 130 may be based on an Intel® Architecture system and the one or more processors 302 and chipset may be from a family of Intel® processors and chipsets, such as the Intel® Atom® processor family.

The memory 310 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAMBUS DRAM (RDRAM), flash memory devices, electrically erasable programmable read only memory (EEPROM), non-volatile RAM (NVRAM), universal serial bus (USB) removable memory, or combinations thereof.

The memory 310 may store program instructions that are loadable and executable on the processor(s) 300, as well as data generated or received during the execution of these programs. Turning to the contents of the memory 310 in more detail, the memory 310 may include one or more operating systems (O/S) 312, an applications module 314, a radio parameters module 316, a directional transmit/receive (T/R) module 318, a coordination module 320, and/or a communications module 322. Each of the modules and/or software may provide functionality for the wireless network devices 130, when executed by the processors 302. The modules and/or the software may or may not correspond to physical locations and/or addresses in memory 310. In other words, the contents of each of the modules 312, 314, 316, 318, 320, 322 may not be segregated from each other and may, in fact be stored in at least partially interleaved positions on the memory 310.

The O/S module 312 may have one or more operating systems stored thereon. The processors 302 may be configured to access and execute one or more operating systems stored in the (O/S) module 312 to operate the system functions of the electronic device. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 314 may contain instructions and/or applications thereon that may be executed by the processors 302 to provide one or more functionality associated with the directional transmission and reception of wireless signals and task processing. These instructions and/or applications may, in certain aspects, interact with the (O/S) module 312 and/or other modules of the wireless network devices 130. The applications module 314 may have instructions, software, and/or code stored thereon that may be launched and/or executed by the processors 302 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The radio parameters module 316 may have instructions stored thereon that, when executed by the processors 302, enable the wireless network devices 130, such as a master wireless network device 130, to provide a variety of radio parameters corresponding to each of the plurality of wireless network devices. In one aspect, the processors 302 may be configured to analyze signals from other wireless network devices 130 corresponding to received wireless signals at those wireless network devices 130 from one or more user devices 120, along with received wireless signals at the master wireless network device 130 to generate the radio parameters corresponding to each of the plurality of wireless network devices 130 (i.e. the master wireless network device and each of the slave wireless network devices). The radio parameters may be related to a transmission amplitude, a transmission phase, and/or a reception sensitivity associated with each of the plurality of wireless network devices 130.

The processors 302 may be configured to generate the radio parameters so that the plurality of wireless network devices, when cooperating in communicating with one or more user devices 120 may transmit with a relatively greater intensity in the direction of each of the one or more user devices 120. Furthermore, the reception sensitivity may be greater from the direction of the one or more user devices 120. Further yet, the reception sensitivity and/or the transmission intensity may be relatively diminished in the direction of one or more sources of noise 220.

It will be appreciated that as the user devices 120, the sources of noise 220, or even the wireless network devices 130 may not be stationary, the wireless network device 130 and the processors thereon 302 may be configured to repeatedly and/or periodically determine and/or update the radio parameters corresponding to each of the plurality of wireless network devices 130. The processors 302 may further be configured to transmit the determined radio parameters to the corresponding respective wireless network devices 130, such as via the communicative backbone link 150. In example embodiments, the processors 302 may be configured to communicate with the other wireless network devices 130 at a relatively higher bandwidth and/or throughput than communication via the networks 140 and/or with the user devices 120. Therefore, signals corresponding to received wireless signals at the slave wireless network devices 130 may be communicated to the master wireless network device 130 at a relatively rapid rate, so that the radio parameters may be quickly determined at the master wireless network device 130. Additionally, the radio parameters and updates to the same may be communicated by the master wireless network device 130 to the slave wireless network device at a relatively rapid rate via the communicative backbone link 150.

The directional T/R module 318 may have instructions stored therein that may be executed by the processors 302 to provide functionality associated with directional transmission and/or reception of wireless signals by the plurality of wireless network devices 130. The processors 302 may be configured to receive signals corresponding to wireless signals received from one or more user devices 120 from each of the wireless network devices 130. The processors 302 may be configured to use these signals to reconstruct the communications signal as transmitted by the user device 120. The reconstruction of the communications signals may entail receiving an indication of the wireless signals at each of the wireless network devices 130 (master and slaves), such as via signals received from the antenna 300 and each of the slave wireless network devices via the communicative backbone link. The processors 302, in certain example embodiments, may be configured to reconstruct the in-phase and quadrature components of each of the communications signals based at least in part on the signals received at each of the wireless network devices 130 and the current set of radio parameters. Furthermore, when information and/or data is to be communicated to one of the one or more user devices 120, the information and/or data may be communicated by the master wireless network device 130 to the slave wireless network devices 130, such as via communicative backbone link 150. The plurality of wireless network devices 130 may then be configured to communicate the information and/or data in a coordinated fashion based at least in part on the current (i.e. the freshest) radio parameters.

It should also be noted that when a particular wireless network device 130 is to operate as a slave wireless network device 130, the processors 302 may be configured to receive one or more radio parameters from another wireless network device 130, such as via the communicative backbone link 150. These radio parameters may be used to tune the radio (transceiver) 308 and/or antenna 300 of the wireless network device 130. By tuning the transmit and/or receive characteristics of the wireless network devices 130 according to the radio parameters, the plurality of wireless network devices 130 may be configured to communicate with the user devices 120 in a directional, and therefore, a relatively more optimal way. The processors 302 being configured to tune the radio 308 according to the received radio parameters, such as radio parameters received from another wireless network device 130 via the communicative backbone link 150, may entail the processors 302 adjusting a transmit and/or receive amplifier gain and/or phase delay.

The coordination module 320 may have instructions stored therein that may be executed by the processors 302 to provide functionality associated with performing tasks that may be requested by one or more of the user devices 120. According to example embodiments of the disclosure, user devices 120 may request tasks to be performed or coordinated by the plurality of wireless network devices 130. In this case, when the wireless network device reconstructs a communications signal received by the plurality of wireless network devices 130, one of the wireless network devices 130, such as the master wireless network device 130 may detect that the communication from the user device 120 includes a task request, corresponding to a task. This task request may include any suitable task including, but not limited to, manipulating an image file, manipulating an audio file, processing a hypertext markup language (HTML) file or other webpage, storing an audio/video file, or the like. The wireless network device 130 that detects the task request may perform the associated task or spawn the task to one of the other wireless network devices 130 or other suitable processing resource, such as via the networks 140. Upon completion of the task, the results of the task, such as a rendered webpage, may be transmitted to the requesting user device 120.

The communications module 322 may have instructions stored therein that may be executed by the processors 302 to provide functionality associated with network connectivity. The processors may be configured to transmit communications from one or more user devices 120 to the networks 140, such as the Internet. The wireless network devices 130 and the processors 302 thereon may further be configured to receive communications form the networks 140 and transmit the same to a target user device 120 via the plurality of wireless network devices 130.

It will be appreciated that there may be overlap in the functionality of the instructions stored in the operating systems (O/S) module 312, the applications module 314, the radio parameters module 316, the directional T/R module 318, the coordination module 320, and/or the communications module 322. In fact, the functions of the aforementioned modules 312, 314, 316, 318, 320, 322 may interact and cooperate seamlessly under the framework of the wireless network devices 130. Indeed, each of the functions described for any of the modules 312, 314, 316, 318, 320, 322 may be stored in any module 312, 314, 316, 318, 320, 322 in accordance with certain embodiments of the disclosure. Further, in certain embodiments, there may be one single module that includes the instructions, programs, and/or applications described within the operating systems (O/S) module 312, the applications module 314, the radio parameters module 316, the directional T/R module 318, the coordination module 320, and/or the communications module 322.

Figure 4:
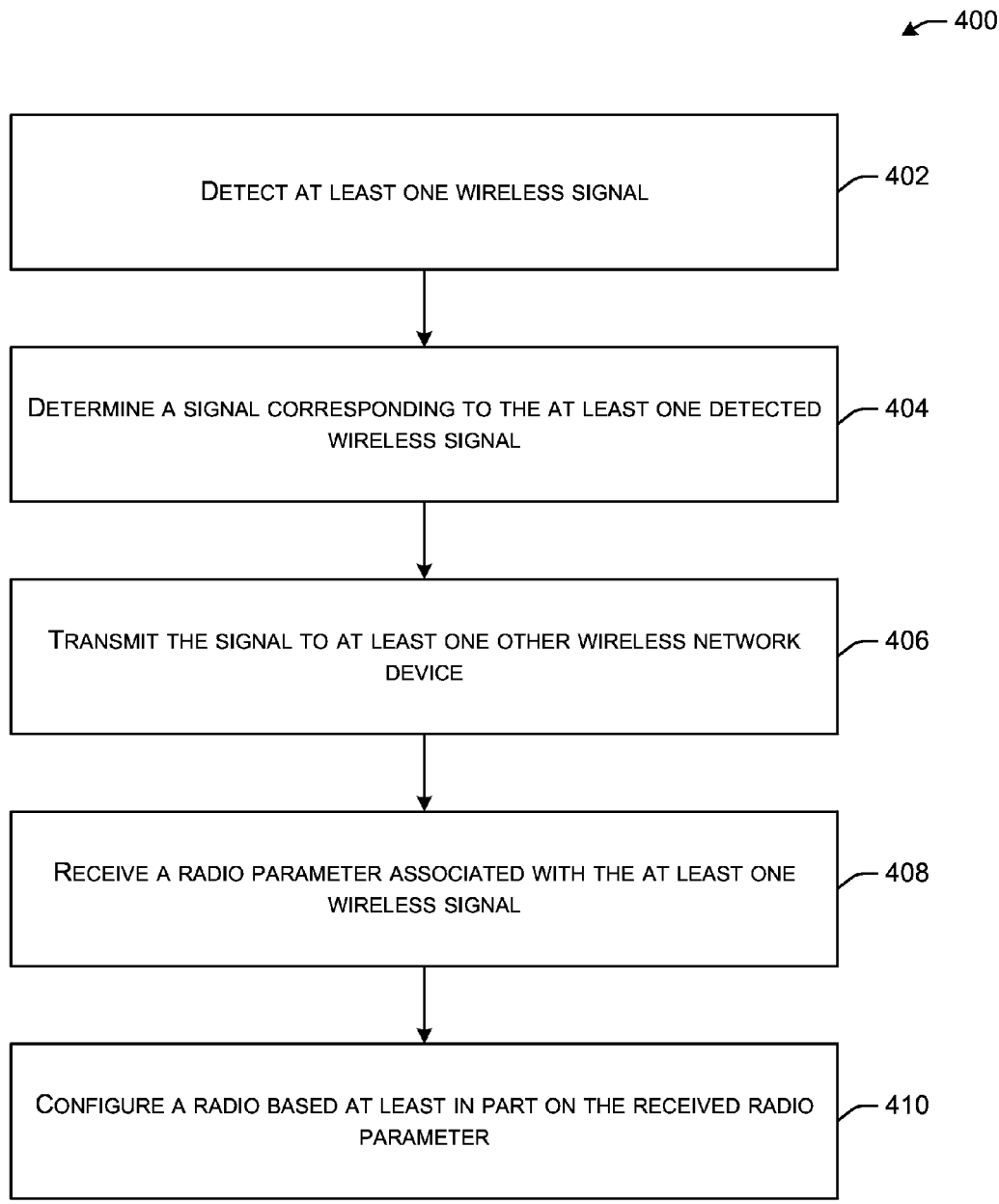
FIG. 4 is a flow diagram illustrating an example method for configuring a radio of a wireless network device, in accordance with certain example embodiments of the disclosure.

FIG. 4 is a flow diagram illustrating an example method 400 for configuring a radio 308 of a wireless network device 130, in accordance with certain example embodiments of the disclosure. The method 400 may be performed, in certain example embodiments, by one or more of the wireless network devices 130 and the processors 302 thereon. In some example cases, the method 400 may be performed by wireless network device 130 operating as a slave wireless network device 130. At block 402, at least one wireless signal may be detected. These wireless signals may be received form one or more user devices 120 within radio range of the wireless network device 130 receiving the wireless signal. As discussed above, the antenna 300 and radio 308 of the wireless network device 130 may receive the wireless signal(s) from the user devices 120 in any suitable format, including, for example, Wi-Fi format.

At block 404, a signal corresponding to the detected at least one wireless signal of block 402 may be determined and/or generated. In some cases, this signal may be the same as the detected wireless signal. In other cases, this signal may be an amplified and/or attenuated version of the detected wireless signal. In certain alternate example embodiments, the determined signal may be a demodulated version of the received wireless signal.

At block 406, the signal determined at block 404 may be transmitted to at least one other wireless network device. In some example embodiments, the wireless network device 130 to which the signal may be transmitted may be a master wireless network device 130 that is configured to reconstruct wireless communications transmitted by the one or more user devices 120 to the wireless network devices 130 and determine radio parameters for each of the wireless network devices 130.

At block 408, a radio parameter associated with the at least one detected wireless signal may be received. These radio parameters may have been determined by the master wireless network device to enable directional transmission and receipt of signals by the plurality wireless network devices 130.

At block 410, a radio may be configured based at least in part on the received radio parameter. The processors 302 of the wireless network device 130 may be configured to tune one or more radio components and/or characteristics in accordance with the received radio parameters. These radio components may include the gain or the phase of one or more amplifiers for receiving and/or transmitting communications signals by the wireless network devices 130 via the radio 308 and the antenna 300.

It will be appreciated that method 400 may be repeated periodically or as needed to continuously update the radio parameters associated with the wireless network devices 130. The updates may be performed to accommodate for changes in the operating environment 100, such as when the user devices 120 and/or noise sources 220 move within the radio range of the plurality of wireless network devices 130.

It should be noted, that the method 400 may be modified in various ways in accordance with certain embodiments of the disclosure. For example, one or more operations of method 400 may be eliminated or executed out of order in other embodiments of the disclosure. Additionally, other operations may be added to method 400 in accordance with other embodiments of the disclosure.

Figure 5:
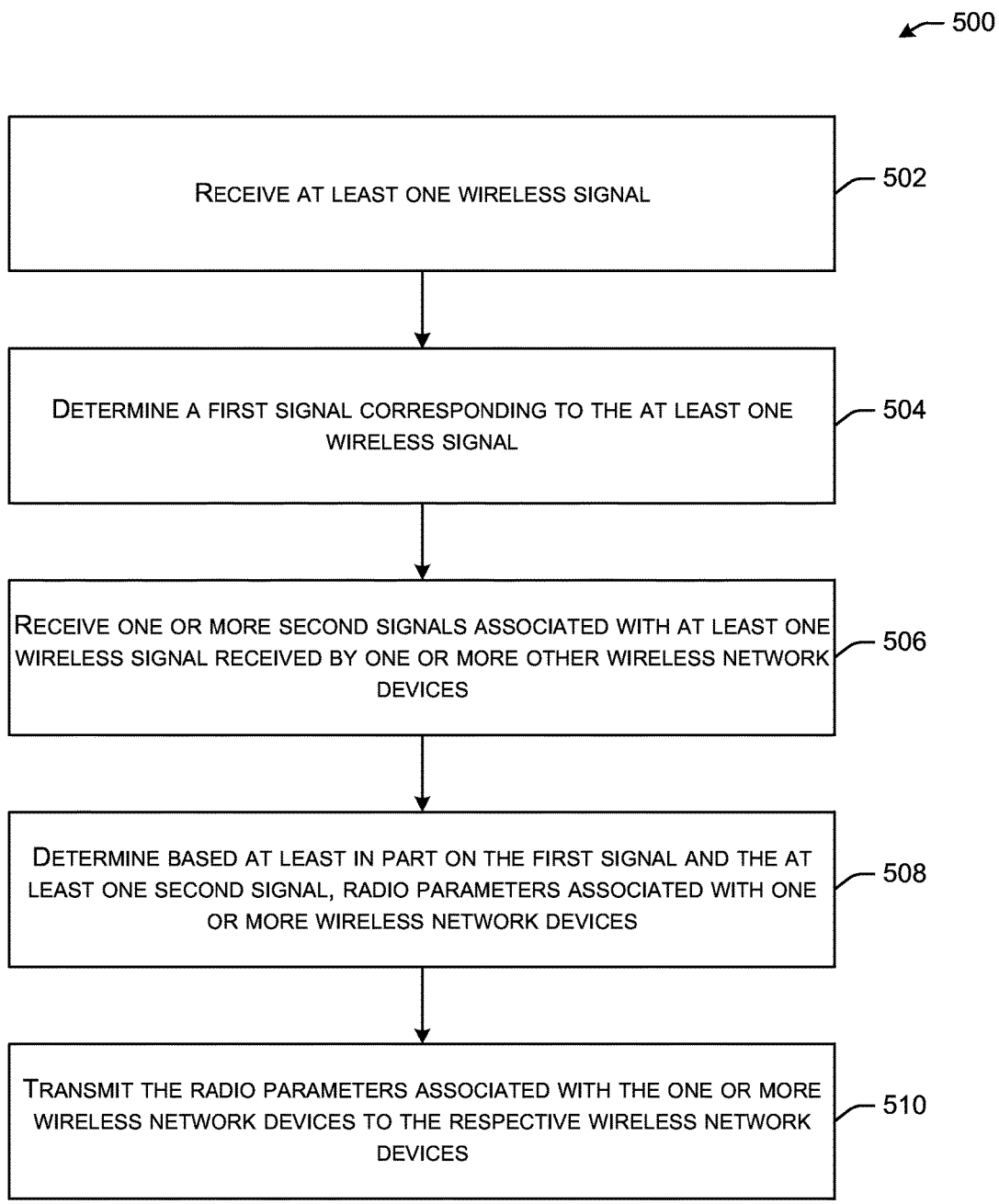
FIG. 5 is a flow diagram illustrating an example method for determining and transmitting one or more radio parameters associated with one or more wireless network devices, in accordance with certain example embodiments of the disclosure.

FIG. 5 is a flow diagram illustrating an example method 500 for determining, generating, and/or selecting and transmitting one or more radio parameters associated with one or more wireless network devices 130, in accordance with certain example embodiments of the disclosure. This method 500 may be performed by a wireless network device 130, such as a master wireless network device 130, and the processors 302 thereon. At block 502, at least one wireless signal may be received. The at least one wireless signal may be received by the wireless network device 130 via its antenna 300 and radio 308 form one or more user devices 120 within radio range of the wireless network device 130. At block 504, a first signal corresponding to the received at least one wireless signal may be determined. This signal, in certain example embodiments, may be an amplified and/or attenuated version of the received wireless signal of block 502. In the same or other cases, the received signal may include data associated with the received signal, such as a signal to noise ratio (SNR) and/or a received signal strength indication (RSSI).

At block 506, one or more second signals associated with at least one wireless signal received by one or more other wireless network devices 130 may be received. In this case, the signals may be received by the master wireless network device 130 from the slave wireless network devices via the communicative backbone link 150. As discussed above, the signals communicated via the communicative backbone link may be at a rate and throughput (i.e. bandwidth) sufficient to enable suitable determination of radio parameters for communications with user devices 120 by the plurality of wireless network devices 130. In some cases, the received signal may be an amplified, attenuated, frequency shifted, and/or phase shifted version of the wireless signal received by each of the wireless network devices 130 from the user devices 120.

At block 508, radio parameters associated with one or more wireless network devices may be determined based at least in part on the first signal and the one or more second signals. The wireless network device 130, such as the master wireless network device 130 and the processors 302 thereon may analyze the signal received to determine an approximate location of the user devices 120 within radio range of the plurality of wireless network devices 130, such as relative ranges/distances to each of the wireless network devices 130. For example, if it is predicted that a stronger signal may be received from a particular user device 120 by reducing the receive sensitivity of one wireless network device 130 and increasing the receive sensitivity of another wireless network device 130, then the appropriate modification of the radio parameters may be performed. These radio parameters may include transmitter power, transmitter phase, and/or receiver sensitivity for the wireless network devices 130. These radio parameters may be calculated or, alternatively, selected from a list of possible radio parameters.

At block 510, the determined radio parameters associated with the one or more wireless network devices may be transmitted to the respective wireless network devices as discussed above, the radio parameters may be communicated to the respective corresponding wireless network device via the communicative backbone link 150.

It should be noted, that the method 500 may be modified in various ways in accordance with certain embodiments of the disclosure. For example, one or more operations of method 500 may be eliminated or executed out of order in other embodiments of the disclosure. Additionally, other operations may be added to method 500 in accordance with other embodiments of the disclosure.

Figure 6:
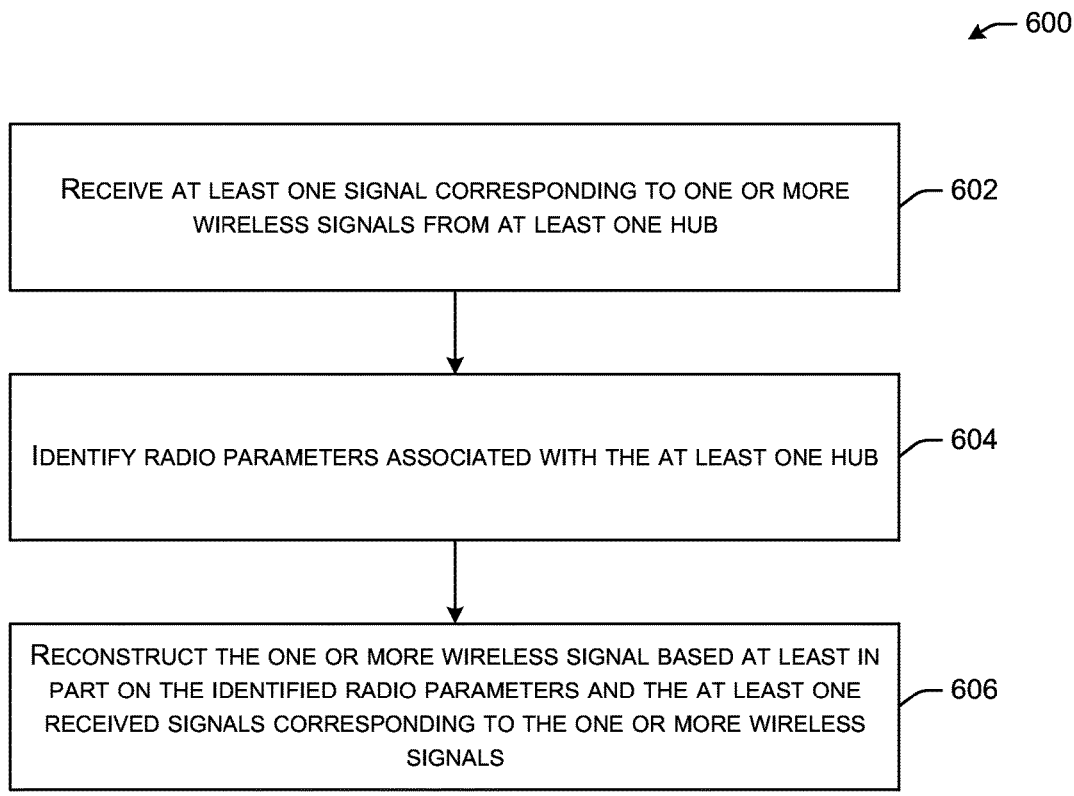
FIG. 6 is a flow diagram illustrating an example method for reconstructing one or more wireless signals detected and/or received by at least one wireless network device, in accordance with certain example embodiments of the disclosure.

FIG. 6 is a flow diagram illustrating an example method 600 for reconstructing one or more wireless signals detected and/or received by at least one wireless network device 130, in accordance with certain example embodiments of the disclosure. The method 600 may be performed by a wireless network device 130, such as a master wireless network device 130, and the processors 302 thereon. At block 602, at least one signal corresponding to one or more wireless signals of one or more user devices from at least one wireless network device may be received. In other words, the signals received may be indicative of wireless signals received by other wireless network devices 130 form one or more user devices 120. In some cases, the received signal may be an amplified, attenuated, frequency shifted, and/or phase shifted version of the wireless signal received by each of the wireless network devices 130 from the user devices 120.

At block 604, radio parameters associated with the at least one wireless network device may be identified. In some cases, the radio parameters may be the most recent radio parameters determined by the wireless network device 130 and communicated to the other wireless network devices 130.

At block 606, the one or more wireless signals may be reconstructed based at least in part on the one or more identified radio parameters and the at least one received signals corresponding to the one or more wireless signals. In some cases, the signal received from each of the user devices 120, such as an in-phase signal component and quadrature signal component, may be a matrix product of each of the received signals from each of the wireless network devices 130 and a matrix related to the current radio components corresponding to each of the wireless network devices 130.

It should be noted, that the method 600 may be modified in various ways in accordance with certain embodiments of the disclosure. For example, one or more operations of method 600 may be eliminated or executed out of order in other embodiments of the disclosure. Additionally, other operations may be added to method 600 in accordance with other embodiments of the disclosure.

Figure 7:
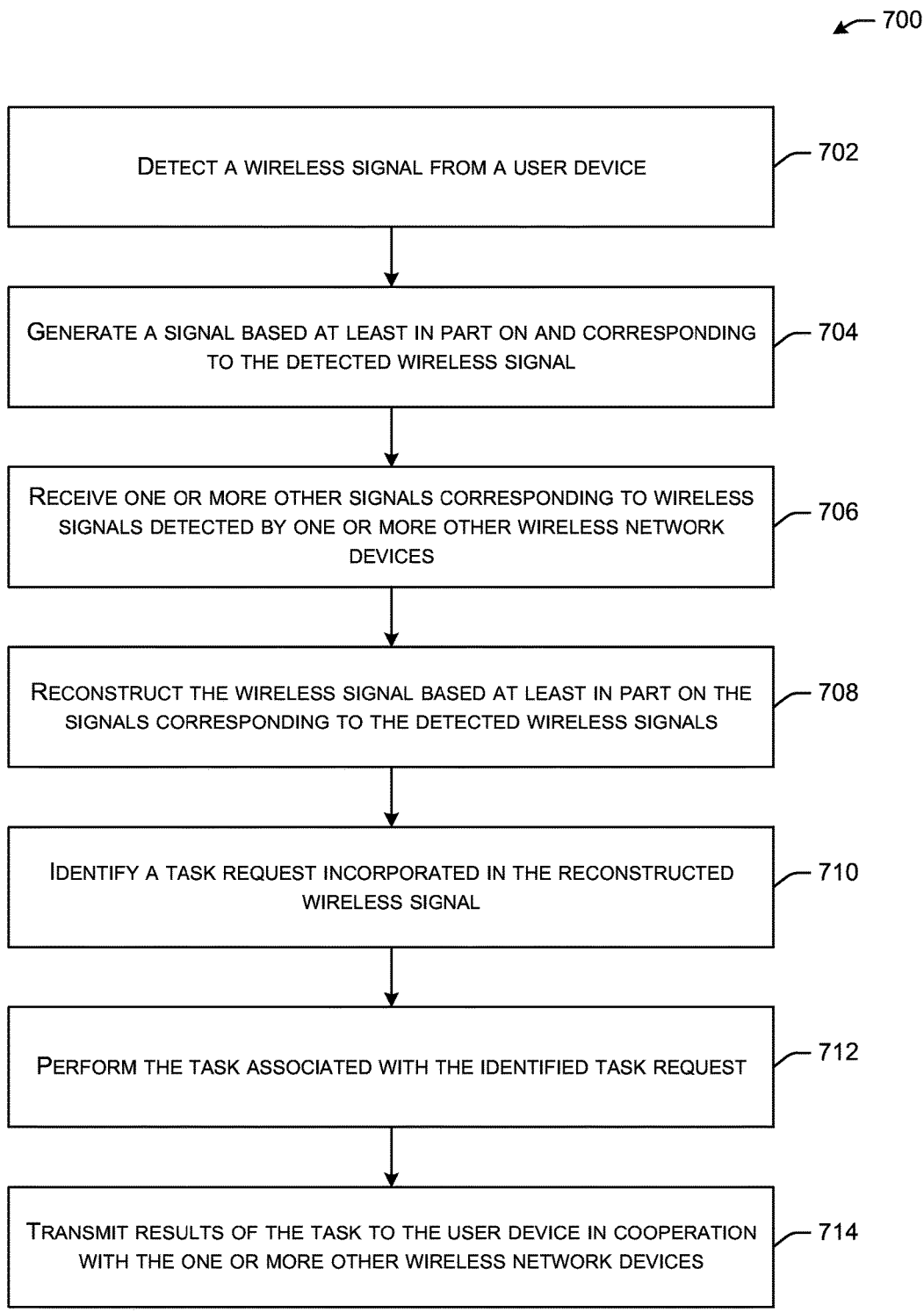
FIG. 7 is a flow diagram illustrating an example method for performing a processing task in a distributed fashion, in accordance with certain example embodiments of the disclosure.

FIG. 7 is a flow diagram illustrating an example method 700 for performing a processing task in a distributed fashion, in accordance with certain example embodiments of the disclosure. The method 700 may be performed by one or more wireless network devices 130, such as a master wireless network device, and the processors 302 thereon. At block 702, a wireless signal from a user device may be detected.

At block 704, a signal corresponding to the detected wireless signal may be generated based at least in part on the detected wireless signal. This signal, in certain example embodiments, may be an amplified and/or attenuated version of the received wireless signal of block 702. At block 706, one or more signals corresponding to the wireless signals detected by one or more other wireless network devices may be received.

At block 708, the wireless signal may be reconstructed based at least in part on the signals corresponding to the detected wireless signals. This process may be similar to the process described with reference to block 606 of method 600 of FIG. 6. The reconstruction may be based on the signals corresponding to detecting the wireless signals at the wireless network device 130 performing method 700, as well as the other wireless network devices 130 from which signals are received at block 706.

At block 710, a task request may be identified as part of the reconstructed wireless signal. This task request, in some cases, may be identified by one or more predefined sequence of symbols, such as characters in metadata associated with packets of data received from the user device 120 by the wireless network devices 130. At block 712, the task associated with the identified task request may be performed. Some example tasks may include, for example, manipulating an image file, manipulating an audio file, processing a hypertext markup language (HTML) file, storing an audio/video file, or the like. At block 714, the results of the performed task may be transmitted back to the requesting user device in cooperation with the other wireless network devices.

It should be noted, that the method 700 may be modified in various ways in accordance with certain embodiments of the disclosure. For example, one or more operations of method 700 may be eliminated or executed out of order in other embodiments of the disclosure. Additionally, other operations may be added to method 700 in accordance with other embodiments of the disclosure.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example embodiments of the disclosure may include a method that may include receiving, by a first wireless network device comprising one or more processors, one or more signals corresponding to wireless signals received by each of at least one second wireless network devices; analyzing, by the first wireless network device, the received signals; determining, by the first wireless network device and based at least in part on the analyzing, one or more radio parameters associated with each of the at least one second wireless network devices; and transmitting, by the first wireless network device, the one or more radio parameters to the corresponding respective at least one second wireless network devices. In example embodiments, the method may further include determining, by the first wireless network device and based at least in part on the one or more radio parameters and the received signals, the one or more wireless signals corresponding to each of one or more user devices. Further still, example embodiments may include a method where the wireless signals received by each of the at least one second wireless network devices correspond, at least in part, to the one or more communications signals corresponding to and transmitted by the one or more user devices. The method may further include reconstructing, by the first network device based at least in part on the received one or more signals from the at least one second wireless network devices, the communications signals transmitted by each of the one or more user devices. Still further the method may include identifying, by the first network wireless device and based at least in part on the reconstructed communications signals, that the reconstructed communications signals carry a task request; performing, by the first network wireless device, a task associated with the task request; and transmitting, by the first network wireless device, results of the task to the one or more user devices. In yet further example embodiments, the wireless signals received by each of the at least one second wireless network devices correspond, at least in part, to one or more sources of noise and wherein determining the one or more radio parameters comprises determining the one or more radio parameters to minimize the detection of noise transmitted by the one or more sources of noise. Still further, the analyzing is based, at least in part, on wireless signals corresponding to one or more user devices received at the first wireless network device. The one or more radio parameters include at least one of: (i) a transmission amplitude; (ii) a transmission phase; or (iii) a reception sensitivity.

Example embodiments of the disclosure may also include one or more computer-readable media comprising computer-executable instructions that, when executed by one or more processors, configure the one or more processors to perform a method comprising receiving first signals corresponding to one or more user devices transmitting communications signals; receiving one or more second signals corresponding to wireless signals received by each of at least one second wireless network devices from the one or more user devices transmitting communications signals; and reconstructing, based at least in part on the received first signals, the one or more second signals, and respective radio parameters corresponding to the first wireless network device and each of the second wireless network devices, the communications signals transmitted by each of the one or more user devices. In further example embodiments, the method may further comprise transmitting the reconstructed communications signals on a network. Further still, the method may comprise receiving a network signal from a network for transmission to one of the one or more user devices; transmitting the network signal to the each of the second wireless network devices; generating a wireless transmit signal based at least in part on the network signal and the one or more radio parameters; and transmitting the wireless transmit signal. The method yet further comprise updating, based at least in part on the received first signals, the one or more second signals, and the one or more respective radio parameters corresponding to the first wireless network device and each of the second wireless network devices. Still further, the method may comprises transmitting the updated one or more respective radio parameters of the at least one second wireless network devices to the corresponding at least one second wireless network devices. With the one or more computer-readable media, the one or more respective radio parameters include at least one of: (i) a transmission amplitude; (ii) a transmission phase; or (iii) a reception sensitivity. Further with the one or more computer-readable media, the method further comprises identifying, based at least in part on the reconstructed communications signals, that the reconstructed communications signals carry a task request; performing a task associated with the task request; and transmitting results of the task to the one or more user devices. The task may include one or more of: (i) manipulating an image file; (ii) manipulating an audio file; (iii) processing a hypertext markup language (HTML) file; (iv) storing an audio/video file.

Further example embodiments of the disclosure may include a wireless network device, comprising an antenna communicatively coupled to a radio and configured to receive one or more wireless signals from one or more user devices transmitting communications signals; a communications link to receive one or more signals from one or more other wireless network devices and corresponding to the communications signals transmitted by the one or more user devices; and one or more processors configured to reconstruct the communications signals transmitted by the one or more user devices based at least in part on the one or more wireless signals, the one or more signals from one or more other wireless network devices and one or more radio parameters. The wireless network device may further include a network connection configured to transmit the reconstructed communications signals. The wireless network device may be configured such that the network connection is further configured to receive a network signal from a network for transmission to one of the one or more user devices; the communications link is further configured to transmit the network signal to each of the second wireless network devices; the one or more processors are further configured to generate a wireless transmit signal based at least in part on the network signal and the one or more radio parameters; and the antenna is configured to transmit the wireless transmit signal. The wireless network device and the one or more processors are further configured to update, based at least in part on the received one or more wireless signals and one or more signals from one or more other wireless network devices, the one or more radio parameters. According to further example embodiments, the communications link is further configured to transmit the updated one or more radio parameters of the at least one second wireless network devices to the respective corresponding at least one second wireless network devices. The one or more radio parameters include at least one of: (i) a transmission amplitude; (ii) a transmission phase; or (iii) a reception sensitivity. Still further, the processors are further configured to identify, based at least in part on the reconstructed communications signals, that the reconstructed communications signals carry a task request; and perform a task associated with the task request; and wherein the antenna is configured to transmit results of the task to the one or more user devices. The task includes one or more of: (i) manipulating an image file; (ii) manipulating an audio file; (iii) processing a hypertext markup language (HTML) file; (iv) storing an audio/video file.

Example embodiments may include an apparatus for directional communications, comprising a means for receiving first signals corresponding to one or more user devices transmitting communications signals; a means for receiving one or more second signals corresponding to wireless signals received by each of at least one second wireless network devices from the one or more user devices transmitting communications signals; and a means for reconstructing, based at least in part on the received first signals, the one or more second signals, and respective radio parameters corresponding to the first wireless network device and each of the second wireless network devices, the communications signals transmitted by each of the one or more user devices. The apparatus may further include a means for transmitting the reconstructed communications signals on a network. The apparatus may further include a means for receiving a network signal from a network for transmission to one of the one or more user devices; a means for transmitting the network signal to the each of the second wireless network devices; a means for generating a wireless transmit signal based at least in part on the network signal and the one or more radio parameters; and a means for transmitting the wireless transmit signal. The apparatus for directional communications may yet further include a means for updating, based at least in part on the received first signals, the one or more second signals, and the one or more respective radio parameters corresponding to the first wireless network device and each of the second wireless network devices, the one or more radio parameters. The apparatus for directional communications may further include a means for transmitting the updated one or more respective radio parameters of the at least one second wireless network devices to the corresponding at least one second wireless network devices. The one or more respective radio parameters include at least one of: (i) a transmission amplitude; (ii) a transmission phase; or (iii) a reception sensitivity. The apparatus may yet further include a means for identifying, based at least in part on the reconstructed communications signals, that the reconstructed communications signals carry a task request; a means for performing a task associated with the task request; and a means for transmitting results of the task to the one or more user devices. The tasks may include one or more of: (i) manipulating an image file; (ii) manipulating an audio file; (iii) processing a hypertext markup language (HTML) file; (iv) storing an audio/video file.

The claimed invention is:

1. A method, comprising:
   receiving, by a hub wireless network device comprising one or more processors, one or more signals corresponding to wireless signals received by each of at least one second wireless network devices;
   analyzing, by the hub wireless network device, the received signals to determine one or more radio parameters corresponding to transceivers of each of the at least one second wireless network devices;
   generating, by the hub wireless network device one or more messages indicating the one or more radio parameters associated with each of the at least one second wireless network devices; and
   transmitting, by the hub wireless network device, the one or more messages to the corresponding respective at least one second wireless network devices; and
   identifying, by the hub network wireless device and based at least in part on reconstructed communications signals, that the reconstructed communications signals carry a task request from one or more user devices;
   performing, by the hub network wireless device, a task associated with the task request and
   transmitting, by the hub network wireless device, results of the task to the one or more user devices.

2. The method of claim 1, further comprising:
   determining, by the hub wireless network device and based at least in part on the one or more radio parameters and the received signals, the one or more wireless signals corresponding to each of one or more user devices.

3. The method of claim 2, wherein the wireless signals received by each of the at least one second wireless network devices correspond, at least in part, to the one or more communications signals corresponding to and transmitted by the one or more user devices.

4. The method of claim 3, further comprising:
   reconstructing, by the hub network device based at least in part on the received one or more signals from the at least one second wireless network devices, the communications signals transmitted by each of the one or more user devices.

5. The method of claim 2, wherein the wireless signals received by each of the at least one second wireless network devices correspond, at least in part, to one or more sources of noise and wherein generating the one or more radio parameters comprises determining the one or more radio parameters to minimize the detection of noise transmitted by the one or more sources of noise.

6. The method of claim 1, wherein the analyzing is further based, at least in part, on wireless signals corresponding to one or more user devices received at the hub wireless network device.

7. The method of claim 1, wherein the one or more radio parameters include at least one of: (i) a transmission amplitude; (ii) a transmission phase; or (iii) a reception sensitivity.

8. One or more non-transitory computer-readable media comprising computer-executable instructions that, when executed by one or more processors, configure the one or more processors to perform a method comprising:
   receiving first signals corresponding to one or more user devices transmitting communications signals;
   receiving one or more second signals from each of at least one second wireless network devices, wherein the one or more second signals correspond to wireless signals received by each of the at least one second wireless network devices from the one or more user devices; and reconstructing, based at least in part on the received first signals, the one or more second signals, and respective radio parameters corresponding to the first wireless network device and each of the second wireless network devices, the communications signals transmitted by each of the one or more user devices, identifying, based at least in part on the reconstructed communications signals, that the reconstructed communications signals carry a task request from one or more user devices;

performing a task associated with the task request; and transmitting results of the task to the one or more user devices.

9. The one or more non-transitory computer-readable media of claim 8, wherein the method further comprises:

transmitting the reconstructed communications signals on a network.

10. The one or more non-transitory computer-readable media of claim 8, wherein the method further comprises:

receiving a network signal from a network for transmission to one of the one or more user devices;

transmitting the network signal to the each of the second wireless network devices;

generating a wireless transmit signal based at least in part on the network signal and the one or more radio parameters; and transmitting the wireless transmit signal.

11. The one or more non-transitory computer-readable media of claim 8, wherein the method further comprises:

updating, based at least in part on the received first signals, the one or more second signals, and the one or more respective radio parameters corresponding to the first wireless network device and each of the second wireless network devices, the one or more radio parameters.

12. The one or more non-transitory computer-readable media of claim 11, wherein the method further comprises:

transmitting the updated one or more respective radio parameters of the at least one second wireless network devices to the corresponding at least one second wireless network devices.

13. The one or more non-transitory computer-readable media of claim 8, wherein the one or more respective radio parameters include at least one of: (i) a transmission amplitude; (ii) a transmission phase; or (iii) a reception sensitivity.

14. The one or more non-transitory computer-readable media of claim 8, wherein the task includes one or more of: (i) manipulating an image file; (ii) manipulating an audio file; (iii) processing a hypertext markup language (HTML) file; (iv) storing an audio/video file.

15. A wireless network device, comprising:

an antenna communicatively coupled to a radio and configured to receive one or more wireless signals from one or more user devices transmitting communications signals;

a communications link to receive one or more signals from one or more other wireless network devices, the one or more signals corresponding to the one or more wireless signals transmitted by the one or more user devices and received at each of the one or more other wireless network devices; and one or more processors configured to reconstruct the communications signals transmitted by the one or more user devices based at least in part on the one or more wireless signals, the one or more signals from one or more other wireless network devices and one or more radio parameters;

identify, based at least in part on the reconstructed communications signals, that the reconstructed communications signals carry a task request from one or more user devices;

perform a task associated with the task request; and wherein the antenna is configured to transmit results of the task to the one or more user devices.

16. The wireless network device of claim 15, further comprising:

a network connection configured to transmit the reconstructed communications signals.

17. The wireless network device of claim 16, wherein:

the network connection is further configured to receive a network signal from a network for transmission to one of the one or more user devices;

the communications link is further configured to transmit the network signal to each of the second wireless network devices;

the one or more processors are further configured to generate a wireless transmit signal based at least in part on the network signal and the one or more radio parameters; and the antenna is configured to transmit the wireless transmit signal.

18. The wireless network device of claim 16, wherein the one or more processors are further configured to update, based at least in part on the received one or more wireless signals and one or more signals from one or more other wireless network devices, the one or more radio parameters.

19. The wireless network device of claim 18, wherein the communications link is further configured to transmit the updated one or more radio parameters of the at least one second wireless network devices to the respective corresponding at least one second wireless network devices.

20. The wireless network device of claim 16, wherein the one or more radio parameters include at least one of: (i) a transmission amplitude; (ii) a transmission phase; or (iii) a reception sensitivity.

21. The wireless network device of claim 15, wherein the task includes one or more of: (i) manipulating an image file; (ii) manipulating an audio file; (iii) processing a hypertext markup language (HTML) file; (iv) storing an audio/video file.

* * * * *